(12) United States Patent
Dou et al.

(10) Patent No.: US 9,096,202 B2
(45) Date of Patent: Aug. 4, 2015

(54) HYDRAULIC ANTILOCK BRAKE DEVICE

(71) Applicant: NANYANG TAI DING TECHNOLOGY CO., LTD, Nanyang, Henan (CN)

(72) Inventors: Lanmei Dou, Henan (CN); Xing Wang, Henan (CN)

(73) Assignee: NANYANG TAI DING TECHNOLOGY CO., LTD, Nanyang (CN)

( * ) Notice: Subject to any disclaimer, the term of this patent is extended or adjusted under 35 U.S.C. 154(b) by 16 days.

(21) Appl. No.: 13/902,874

(22) Filed: May 27, 2013

(65) Prior Publication Data

US 2013/0257141 A1    Oct. 3, 2013

Related U.S. Application Data

(63) Continuation of application No. PCT/CN2011/073353, filed on Apr. 27, 2011.

(30) Foreign Application Priority Data

Nov. 26, 2010   (CN) .............................. 201010571161

(51) Int. Cl.
| | |
|---|---|
| *B60T 8/32* | (2006.01) |
| *B60T 13/14* | (2006.01) |
| *B60T 17/04* | (2006.01) |
| *B60T 17/02* | (2006.01) |
| *F16D 65/18* | (2006.01) |
| *F16D 65/22* | (2006.01) |
| *B60T 8/34* | (2006.01) |
| *F16D 121/04* | (2012.01) |

(52) U.S. Cl.
CPC ............. *B60T 13/148* (2013.01); *B60T 8/3295* (2013.01); *B60T 13/141* (2013.01); *B60T 17/02* (2013.01); *B60T 17/04* (2013.01); *F16D 65/18* (2013.01); *F16D 65/22* (2013.01); *B60T 8/341* (2013.01); *F16D 2121/04* (2013.01)

(58) Field of Classification Search
CPC ..... B60T 8/3295; B60T 8/341; B60T 13/148; B60T 17/04
See application file for complete search history.

(56) References Cited

U.S. PATENT DOCUMENTS 3,802,746 A * 4/1974 Walser ............................ 303/10
5,382,085 A * 1/1995 Zbinden ........................... 303/7

FOREIGN PATENT DOCUMENTS

| CN | 1133799 | 10/1996 |
|---|---|---|
| CN | 101029634 | 9/2007 |
| DE | 102004037308 | 2/2005 |

OTHER PUBLICATIONS

International Search Report issued by the International Search Authority for the PCT patent application No. PCT/CN2011/073353.

*Primary Examiner* — Thomas Irvin

(57) ABSTRACT

A hydraulic antilock brake device, comprises an oil tank filled with hydraulic oil, a pump electric motor group, a one-way valve, a piloted overflow valve, a manual two-position three-way valve, an adjustable throttling valve, an adjustable throttle valve, a high pressure oil inlet tube, and an oil return tube. the high pressure oil inlet tube and the oil return tube are communicated with a hydraulic controlled negative feedback two-position four-way valve, which is communicated with a brake cylinder connected with a friction sheet. Fast valve holes are provided at two ends of an inner chamber of said hydraulic controlled negative feedback two-position four-way valve, and fast valves are located in the fast valve holes. Two ends of an inner chamber of said braking cylinder are provided with feed-back grooves communicated with the fast valve holes by oil passage. The hydraulic antilock brake device can ensure the driving safety.

2 Claims, 2 Drawing Sheets

HYDRAULIC ANTILOCK BRAKE DEVICE

CROSS-REFERENCE TO RELATED APPLICATIONS

This present application is a Continuation Application of PCT application No. PCT/CN2011/073353 filed on Apr. 27, 2011, which claims the benefit of Chinese Patent Application No. 201010571161.8 filed on Nov. 26, 2010; the contents of which are hereby incorporated by reference.

FIELD OF THE INVENTION

The present invention relates to an automotive vehicle braking device, and more particularly to a hydraulic controlled antilock hydraulic braking device.

DESCRIPTION OF RELATED ART

Antilock braking device can keep wheels of automotive vehicles from being completely locked and prevent the vehicles from losing control when braking. For the moment, the new developed vehicles are provided with antilock braking device. In braking process, for a variety of reasons, braking efficiency of four wheels of a vehicle is inconsistency, some wheels being locked occurs, and resulting in off tracking, losing control, side sliding consequences, and so on. Especially in an emergency braking during a high-speed driving course, due to a vehicle losing control from a wheel locked, causing severe casualties. Therefore, the antilock braking device is developed. The main purpose of the development, the four wheel braking device can reach the maximum braking efficiency without being locked, so as to reducing braking distance, and improving control stability. An antilock braking device includes sensor, controller and regulator. The controller and the regulator are typically microprocessors. When a driver claps on the brake pedal, master cylinder output some hydraulic pressure to a branch cylinder according to the amount of force applied on the brake pedal. The sensor on the wheel monitors change of angular velocity of the running wheel, and transmit the collecting information to the controller immediately. Once the controller finds some great change of the angular velocity, it sends command to the regulator to adjust braking pressure of the wheel braking device. i.e., when the wheel is substantially block, reducing braking pressure, so as to keep the vehicle in a stop or non-stop, wheeling or sliding state, friction force with the ground always in close proximity to the maximum static friction. Then increase braking pressure, until the wheel is substantially blocked and then depressure again. Increasing pressure and depressure could be repeated about ten times per second. Therefore, in one aspect braking efficiency is maximized, in another aspect avoiding wheel being block and the vehicle losing control. After the antilock braking devices are applied on automotive vehicles, excellent braking efficiency is achieved, especially on a slippery ice and snow covered pavements, braking distance is reduced 20-30% on average, and Safety performance of vehicle is greatly improved. There may be no enough space to mount an electronic antilock braking system (ABS) in a vehicle, since the ABS has a large volume. Electronic ABS initiates braking process at the split second when the wheel is blocked, Cadence braking happens 6-12 times per second. As increase frequency of the cadence braking, braking force will get more linear, braking process will get more stable, and braking distance will be reduced. In a typically cadence braking, braking frequency depends on reversing of solenoid valve. Because of response speed of solenoid spool of corresponding valve is limited, the cadence braking frequency cannot be improved, and consequently a typical braking device cannot greatly reducing the braking distance.

SUMMARY OF THE INVENTION

The technical problem to be solved by the present invention is to provide a hydraulic antilock brake device with respect to deficiencies of the prior art, to form a compact braking structure, realize stable braking, shorten braking distance.

In order to solve this technical problem, one embodiment of the present invention provides a hydraulic antilock brake device including an oil tank containing hydraulic oil, a pump electric motor group, a one-way valve, a piloted overflow valve, a first manual two-position three-way valve, an adjustable throttling valve, a hydraulic controlled negative feedback two-position four-way valve, a brake cylinder connected with the hydraulic controlled negative feedback two-position four-way valve, a friction sheet connected with the brake cylinder, a high pressure oil inlet tube connected with the hydraulic controlled negative feedback two-position four-way valve, and an oil return tube connected with the hydraulic controlled negative feedback two-position four-way valve. Fast valve holes communicated with a valve core chamber of the hydraulic controlled negative feedback two-position four-way valve are provided at two ends of an inner chamber of the hydraulic controlled negative feedback two-position four-way valve, and fast valves are located in the fast valve holes. Feedback grooves defined at two endportions of inner chamber of the brake cylinder, and the feedback grooves respectively communicated with corresponding fast valve holes by oil passages.

Another embodiment of the present invention includes two brake cylinders, and the two brake cylinders are arranged in an opposite direction.

A hydraulic control two-position three-way valve is parallel connected to an outlet of the one-way valve, a second manual two-position three-way valve is engaged with an outlet of the hydraulic control two-position three-way valve, a brake cylinder is engaged with an outlet of the second manual two-position three-way valve, and the brake cylinder is engaged with a tensional parking brake.

A power accumulator is parallel connected with an outlet of the one-way valve.

BRIEF DESCRIPTION OF THE DRAWINGS

Technical solutions of the present invention will be described in detail below with reference to accompanying drawings and specific embodiments.

DETAILED DESCRIPTION

Figure 1:
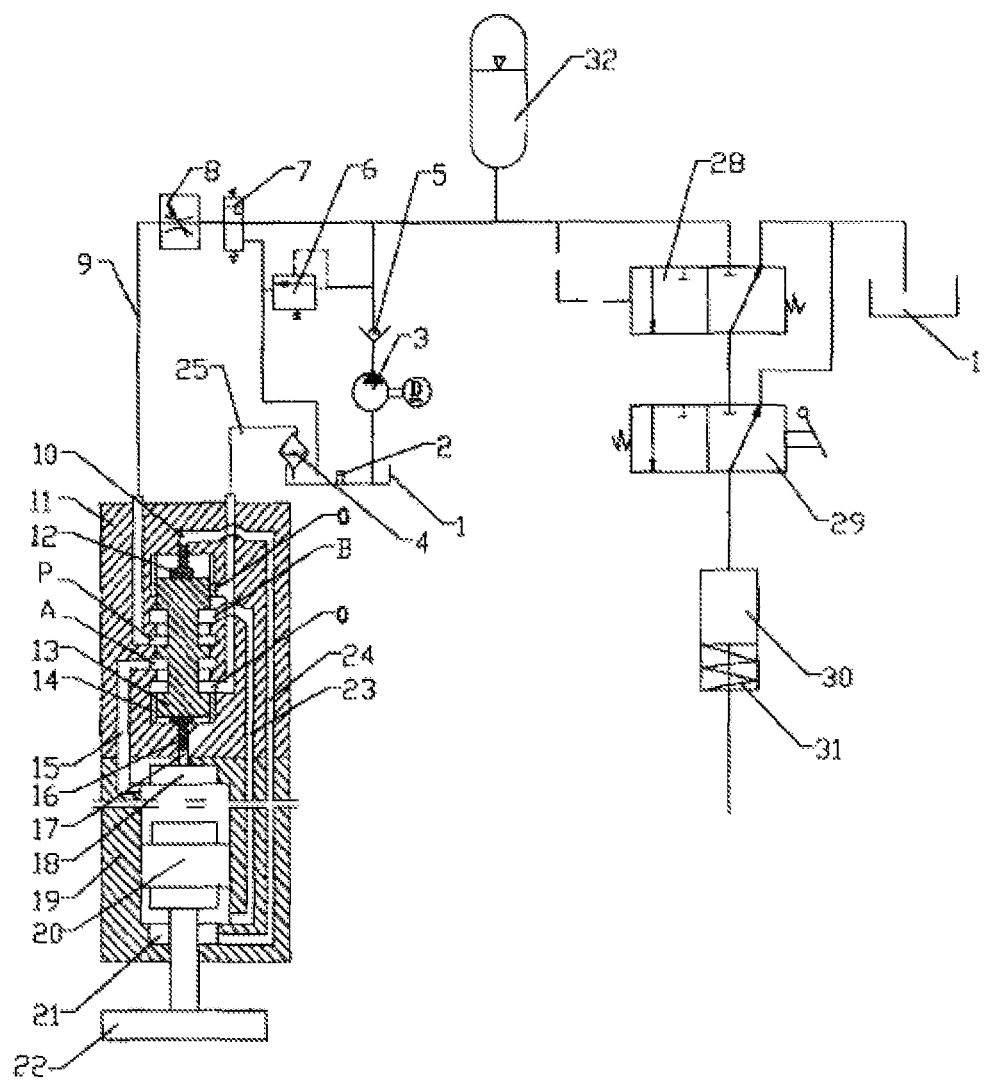
FIG. 1 is a schematic view of a hydraulic antilock brake device according to an embodiment of the present invention.
Figure 2:
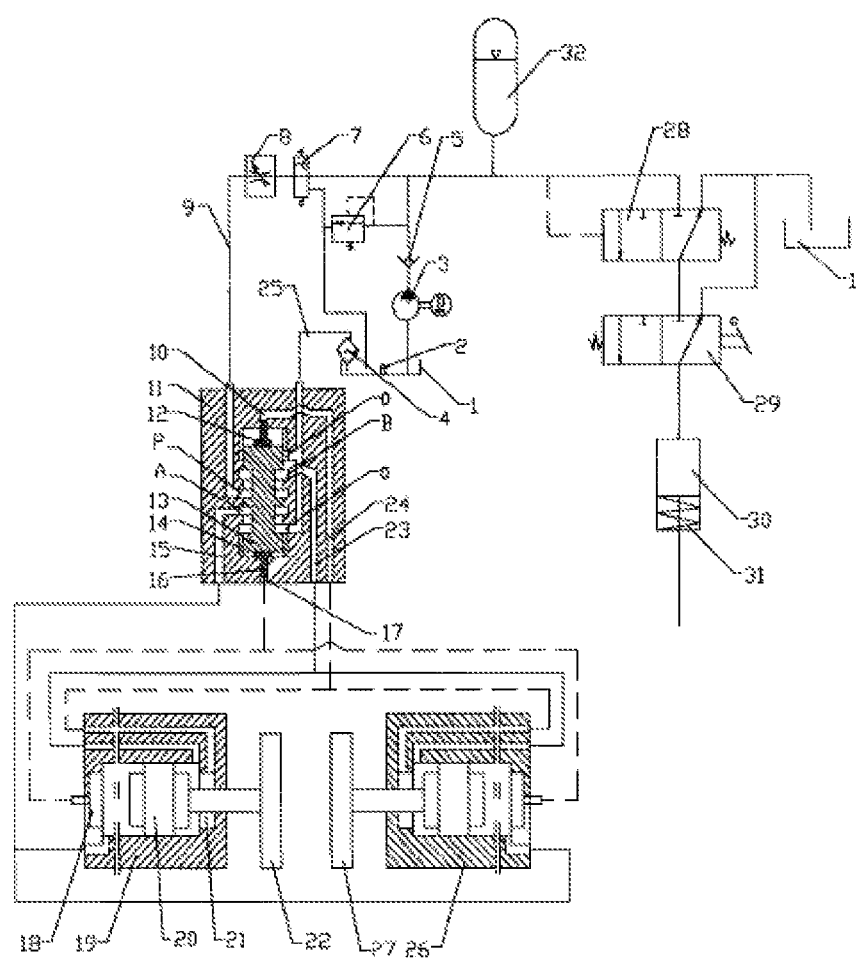
FIG. 2 is a schematic view of a hydraulic antilock brake device for disc brake device according to another embodiment of the present invention.

Referring to FIG. 1, showing a hydraulic antilock brake device of the preferred embodiment, mainly applied in dram brake system. The hydraulic antilock brake device includes an oil tank 1 containing hydraulic oil, a pump electric motor group 3, a one-way valve 5, a piloted overflow valve 6, a first manual two-position three-way valve 7, an adjustable throttling valve 8, a high pressure oil inlet tube 9 and an oil return tube 25. The oil tank 1 forms a separating board 2, thereby defining two spaces at the bottom of the oil tank 1, and the hydraulic oil outputted from oil return tube can be precipitated therein. Entrance of the pump electric motor group 3 is laid in the space opposite the precipitating space, and output of the pump electric motor group 3 is connected with the one-way valve 5. The one-way valve 5 is connected with both the piloted overflow valve 6 and the first manual two-position three-way valve 7. Exit of the piloted overflow valve 6 is communicated with the oil tank 1. Exit of the first manual two-position three-way valve 7 is jointed with the adjustable throttling valve 8. The high pressure oil inlet tube 9 connected with the adjustable throttling valve 8 carries high pressure hydraulic brake oil. A fine filter is mounted to the oil return tube 25. Outlet of the oil return tube 25 is laid in the precipitating space. A power accumulator 32 is parallel connected with an outlet of the one-way valve 5, so as to keep predetermined pressure in the high pressure oil inlet tube 9, and stabilizing the pressure therein. The high pressure oil inlet tube 9 and the oil return tube 25 are both connected with the hydraulic controlled negative feedback two-position four-way valve 11. A first brake cylinder 19 is coupled with the hydraulic controlled negative feedback two-position four-way valve 11, a friction sheet 22 is connected with the first brake cylinder 19. The hydraulic controlled negative feedback two-position four-way valve includes a valve body 11, a valve core chamber is defined inside the valve body 11. The valve core 13 is received inside the valve core chamber. The valve body 11 defines a P opening for leading in high pressure brake oil and O opening for leading out high pressure brake oil. The high pressure oil inlet tube 9 is coupled with the P opening, and the oil return tube 25 is coupled with the O opening. Oil returning slots 14 are defined along the axial direction in the upper and lower inner wall of the valve core chamber of the hydraulic controlled negative feedback two-position four-way valve, thereby keeping the valve core chamber next to the end portions of the valve core 13 being communicated with the oil return tube, and reducing motion resistance force when the valve core 14 reciprocating therein. A first and second fast valve holes 10, 17 are defined in the valve body 11 respectively at endportions of the valve core chamber, and communicated with the valve core chamber of the hydraulic controlled negative feedback two-position four-way valve. A first and second fast valves 12, 16 are respectively mounted in corresponding first and second fast valve holes 10, 17. The first brake cylinder 19 is divided by a piston 20 into a non-piston chamber and a piston chamber. An upper negative feedback groove 18 and a lower negative feedback groove 21 are respectively defined at two endportions of an inner chamber of the first brake cylinder 19. The upper negative feedback groove 18 is communicated with the second fast valve hole 17 in the hydraulic controlled negative feedback two-position four-way valve. The lower negative feedback groove 21 is communicated with an oil controlling channel 24, and exit of the oil controlling channel 24 is jointed with the second fast valve hole 10 of the hydraulic controlled negative feedback two-position four-way valve. Side of upper portion of the non-piston chamber is communicated with an upper channel 15, another exit of the upper channel 15 is jointed with an A opening of the hydraulic controlled negative feedback two-position four-way valve. Side of the bottom of the piston chamber is communicated with a lower channel 23, and another exit of the lower channel 23 is jointed with a B opening of the hydraulic controlled negative feedback two-position four-way valve. Referring to FIG. 2, showing a hydraulic antilock brake device of the alternative embodiment, mainly applied in disc brake system. The hydraulic controlled negative feedback two-position four-way valve 11 is coupled with two first brake cylinders 19, 26, and the two first brake cylinders 19, 21, are arranged in an opposite direction. The two first brake cylinders 19, 26, respectively coupled with friction sheets 22, 27. The two friction sheets 22, 27 simultaneously reciprocate along the same shifting axle, driven by corresponding first brake cylinders 19, 21, so as to hold tight and release the disc quickly thereby forming the cadence braking. To illustrate a further improvement, A hydraulic control two-position three-way valve 28 is parallel connected to an outlet of the one-way valve 5. A second manual two-position three-way valve 29 is engaged with an outlet of the hydraulic control two-position three-way valve 28. A second brake cylinder 30 is engaged with an outlet of the second manual two-position three-way valve 29. An elastic member 31 is mounted in a piston chamber of the second brake cylinder 30. The second brake cylinder 30 is engaged with a tensional parking brake. When the pressure in the hydraulic pressure system is not enough, relating service braking system is unable to work, which brings into a dangerous braking failure state. In this occasion, hydraulic oil cannot turn on the hydraulic control two-position three-way valve 28, and the hydraulic oil directly flows back to the oil tank through the oil returning hole of the hydraulic control two-position three-way valve 28. Therefore the second brake cylinder 30 is unable to start working. Under effect of the elastic member 31 inside the second brake cylinder 30, make the tensional parking brake locking the hub of the wheels or the braking disc, thereby fulfilling the braking purpose, and ensuring driving safety. When the pressure in the hydraulic pressure system increases to a normal pressure range, the second brake cylinder 30 starts to work, and overcomes pressure of the elastic member 31, the vehicle can be normally operated.

The effective results applying said hydraulic antilock brake device embodiments are described as follows. Power components of the hydraulic antilock brake device includes oil tank containing hydraulic oil, a pump electric motor group, a one-way valve, a piloted overflow valve, a manual two-position three-way valve, an adjustable throttling valve. Oil inlet tube of the power components is communicated with the hydraulic controlled negative feedback two-position four-way valve. The brake cylinder is connected with the hydraulic controlled negative feedback two-position four-way valve, and a friction sheet is connected with the brake cylinder. Two fast valves are respectively mounted in two endportions of the hydraulic controlled negative feedback two-position four-way valve. The fast valves can push valve core of the hydraulic controlled negative feedback two-position four-way valve to reciprocate in the valve core chamber, and modulate oil passage connection with the brake cylinder, thereby realizing a straight reciprocating motion for the piston of the brake cylinder, bringing the friction sheet to rapidly contact the brake hub or brake disc of the vehicle, and achieving braking purpose. By adjusting flux of the adjustable throttling valve and negative feedback between the brake cylinder and the hydraulic controlled negative feedback two-position four-way valve, the piston's commutation frequency of the negative feedback cylinder is modulated by the adjustable throttling valve. Oil circuit response speed of the brake cylinder can reach 1250-1350 m/s, and corresponding braking frequency can achieve 300 times/second, which serves as constant braking and releasing braking. The hydraulic antilock brake device makes use of impact force to do work, instead of traditional friction force to do work. According to conservation law of energy, $\frac{1}{2} MV^2 = 10\ FS$, when $V^2$ is constant, the greater the braking force, the shorter the braking distance. Know from physics, impact force is 20~200 times to friction force, replacing traditional friction force by impact force, the braking distance ban be greatly reduced. Known from braking curve, friction brake is composed of two straight lines, i.e., a steep line with velocity plunging in an initial deceleration stage and a skew line with small sloop in a later deceleration stage. In the initial deceleration stage, the acceleration—a is large, causing great rotating inertial force. At this time, the braking frequency is 300 times/second, realizing working of the impact force. Then the braking curve is a skew line with small sloop, the acceleration—a is small, causing small rotating inertial force, thereby greatly reducing the braking distance. Therefore, the hydraulic antilock brake device of the present embodiment can avoid losing control, off tracking, side sliding consequences in emergency braking occasions, and wheel antilock when braking. When braking, the wheels of vehicle are not restricted with one spot friction against the ground, so as to increase friction force and achieve 98% braking efficiency. To sum up, applying hydraulic antilock brake device of the present embodiment ensures braking safety, reducing braking consumption, prolonging over twice of the service life of the raking hub, the braking disc, and the wheels of the vehicle.

Finally, it should be noted that the above embodiments merely are explanatory and are not restrictive of the present invention. Although the present invention is detailedly explained with reference to preferred embodiments, it will be understood by those skilled in the art that amendment or equivalent alternative can be made herein without departing from the spirit and scope of the invention, and they all should be covered by the scopes of the claims of the present invention.

What is claimed is:

1. A hydraulic antilock brake device, comprising:
    an oil tank containing hydraulic oil, a separating board formed inside the oil tank, defining a precipitating space and an oil space at the bottom of the oil tank;
    a one-way valve;
    a piloted overflow valve;
    a manual two-position three-way valve;
    a first manual two-position three-way valve;
    an adjustable throttling valve;
    a pump electric motor group, Entrance of the pump electric motor group laid in the oil space and output of the pump electric motor group connected with the one-way valve, the one-way valve connected with the piloted overflow valve and the manual two-position three-way valve, Exit of the piloted overflow valve communicated with the oil tank in the precipitating space, and the first manual two-position three-way valve jointed with a adjustable throttling valve;
    a high pressure oil inlet tube;
    an oil return tube;
    a hydraulic controlled negative feedback two-position four-way valve, comprising a valve body, a valve core chamber defined inside the valve body, the valve body comprising an oil leading-in opening (P) and an oil returning opening (O), The oil leading-in opening communicated with the adjustable throttling valve by the high pressure oil inlet tube, the oil returning opening communicated with the oil return tube, exit of the oil return tube arranged in the precipitating space of the oil tank;
    oil returning slots defined along the axial direction in the upper and lower wall of the valve core chamber of the hydraulic controlled negative feedback two-position four-way valve, thereby keeping the valve core chamber next to the end portions of the valve core being communicated with the oil return tube, and reducing motion resistance force when the valve core reciprocating therein;
    a first and second fast valve holes defined at endportions of the valve core chamber, and the first and second fast valve holes communicated with the valve core chamber;
    a first and second fast valves respectively mounted in the first and second fast valve holes;
    at least a first brake cylinder, connected with a friction sheet;
    an upper negative feedback groove and a lower negative feedback groove defined at two endportions of the first brake cylinder, the upper negative feedback groove communicated with the second fast valve hole in the hydraulic controlled negative feedback two-position four-way valve, the lower negative feedback groove communicated with an oil controlling channel, and exit of the oil controlling channel jointed with the first fast valve hole of the hydraulic controlled negative feedback two-position four-way valve;
    the first brake cylinder is divided by a piston into a non-piston chamber and a piston chamber, side of upper portion of the non-piston chamber communicated with an upper channel, the upper channel jointed with an A opening of the hydraulic controlled negative feedback two-position four-way valve, side of the bottom of the piston chamber communicated with a lower channel, and the lower channel jointed with a B opening of the hydraulic controlled negative feedback two-position four-way valve;
    the friction sheet driven by the first brake cylinder, so as to hold tight and release the disc quickly thereby forming the cadence braking;
    a hydraulic control two-position three-way valve is parallel connected to an outlet of the one-way valve, a second manual two-position three-way valve is engaged with an outlet of the hydraulic control two-position three-way valve, a second brake cylinder is engaged with an outlet of the manual two-position three-way valve, and the second brake cylinder is engaged with a tensional parking brake, an elastic member is mounted in a piston chamber of the second brake cylinder;
    when the pressure in a hydraulic pressure system is not enough, relating service braking system is unable to work, hydraulic oil cannot turn on the hydraulic control two-position three-way valve, and the hydraulic oil directly flows back to the oil tank through the oil returning hole of the hydraulic control two-position three-way valve, therefore the second brake cylinder is unable to start working, under effect of the elastic member inside the second brake cylinder, make the tensional parking brake locking the hub of the wheels or the braking disc;
    when the pressure in the hydraulic pressure system increases to a normal pressure range, the second brake cylinder starts to work, and overcomes pressure of the elastic member, the vehicle is normally operated.

2. The hydraulic antilock brake device as recited in claim 1, wherein two the first brake cylinders are connected with the hydraulic controlled negative feedback two-position four-way valve, and the two first brake cylinders are arranged in an opposite direction.

* * * * *